(12) United States Patent
Duyvesteyn et al.

(10) Patent No.: US 7,927,565 B2
(45) Date of Patent: Apr. 19, 2011

(54) NOZZLE REACTOR AND METHOD OF USE

(75) Inventors: Willem P. C. Duyvesteyn, Reno, NV (US); Jose Armando Salazar, Reno, NV (US)

(73) Assignee: Marathon Oil Canada Corporation, Calgary, Alberta (CA)

( * ) Notice: Subject to any disclaimer, the term of this patent is extended or adjusted under 35 U.S.C. 154(b) by 140 days.

(21) Appl. No.: 12/466,923

(22) Filed: May 15, 2009

(65) Prior Publication Data

US 2009/0266741 A1 Oct. 29, 2009

Related U.S. Application Data

(63) Continuation-in-part of application No. 11/233,385, filed on Sep. 21, 2005, now Pat. No. 7,618,597.

(60) Provisional application No. 60/641,459, filed on Jan. 3, 2005.

(51) Int. Cl.
*B01J 10/00* (2006.01)
*B01J 8/08* (2006.01)
*B01J 8/02* (2006.01)

(52) U.S. Cl. ........ 422/618; 422/600; 422/608; 422/220; 156/345.33; 427/213

(58) Field of Classification Search .................. 422/194, 422/220, 600, 608, 618; 156/345.33; 427/213
See application file for complete search history.

(56) References Cited

U.S. PATENT DOCUMENTS

| | | | |
|---|---|---|---|
| 2,658,861 A * | 11/1953 | Pevere et al. | 208/408 |
| 3,389,075 A * | 6/1968 | Addison | 208/66 |
| 3,565,593 A | 2/1971 | Moore et al. | |
| 3,565,594 A | 2/1971 | Moore | |
| 3,565,968 A | 2/1971 | Hicks | |
| 3,692,859 A * | 9/1972 | Cottle | 549/429 |
| 4,320,091 A * | 3/1982 | Irvin | 422/190 |
| 4,427,537 A | 1/1984 | Dean et al. | |
| 4,723,272 A * | 2/1988 | Maat | 379/211.01 |
| 4,724,272 A | 2/1988 | Raniere et al. | |
| 5,044,552 A | 9/1991 | Becker et al. | |
| 5,108,583 A | 4/1992 | Keon | |

(Continued)

FOREIGN PATENT DOCUMENTS

CA 2346181 4/2001

(Continued)

OTHER PUBLICATIONS

Penberthy Houdaille, "Jet Pump Technical Data—pumping liquids" pp. 1-11 (1982).

(Continued)

*Primary Examiner* — Walter D Griffin
*Assistant Examiner* — Huy-Tram Nguyen
(74) *Attorney, Agent, or Firm* — Holland & Hart LLP

(57) ABSTRACT

A nozzle reactor system for increasing the conversion rate of material feed injected into the nozzle reactor system. The system includes two or more nozzle reactors aligned in series, such that material exiting a first nozzle reactor may be injected into a second nozzle reactor. Each nozzle reactor includes an interior reactor chamber and an injection passage and a material feed passage that are each in material injecting communication with the interior reactor chamber. Furthermore, the injection passage is aligned transversely to the injection passage. The injection passage is configured to accelerate cracking material passed therethrough to a supersonic speed. A method of increasing the conversion rate of material feed utilizing multiple cracking steps is also described.

12 Claims, 7 Drawing Sheets

U.S. PATENT DOCUMENTS

| | | | |
|---|---|---|---|
| 5,254,325 A * | 10/1993 | Yamasaki et al. | 423/450 |
| 5,565,090 A | 10/1996 | Gosling et al. | |
| 5,798,137 A | 8/1998 | Lord et al. | |
| 5,896,435 A | 4/1999 | Gautier et al. | |
| 6,042,717 A | 3/2000 | Radcliffe et al. | |
| 6,352,639 B2 | 3/2002 | Ito et al. | |
| 6,827,786 B2 | 12/2004 | Lord | |
| 6,936,227 B1 | 8/2005 | De Souza et al. | |
| 7,018,435 B1 | 3/2006 | Wentinck | |
| 2002/0035892 A1 | 3/2002 | Allemand et al. | |
| 2002/0081250 A1 | 6/2002 | Lord | |
| 2002/0151604 A1 | 10/2002 | Detering et al. | |
| 2002/0162518 A1 | 11/2002 | Dumaz et al. | |
| 2003/0109758 A1 * | 6/2003 | Gobbel et al. | 568/881 |
| 2004/0065589 A1 | 4/2004 | Jorgensen | |

FOREIGN PATENT DOCUMENTS

| | | |
|---|---|---|
| CA | 2224615 | 7/2001 |

OTHER PUBLICATIONS

International Search Report for PCT/US2005/034092, filed Jul. 26, 2007, 2 pages, date written May 20, 2007.

Written Opinion for PCT/US2005/34092, filed Jul. 26, 2007, 7 pages, date written May 20, 2007.

* cited by examiner

NOZZLE REACTOR AND METHOD OF USE

This patent application is a continuation-in-part of U.S. patent application Ser. No. 11/233,385, pending, entitled "Nozzle Reactor and Method of Use," filed Sep. 21, 2005, which claims priority to U.S. Provisional Patent Application Ser. No. 60/641,459, filed on Jan. 3, 2005, both of which are incorporated herein by reference in their entireties. In the event of a conflict, the subject matter explicitly recited or shown herein controls over any subject matter incorporated by reference. All definitions of a term (express or implied) contained in any of the subject matter incorporated by reference herein are hereby disclaimed.

FIELD

This application relates to nozzle reactors, and methods of use, and more specifically, to nozzle reactors for receipt of material feed stock and injection of the material feed stock and an additional material into a reactor chamber in order cause interaction between the feed stock and additional material within reactor chamber. This application further relates to a nozzle reactor system and an associated method for increasing the total conversion of hydrocarbon sources into useful lighter liquid hydrocarbons.

BACKGROUND

Nozzle reactors have long been used to inject differing types of materials into a reactor chamber in the nozzle reactor for the purpose of seeking to cause the materials to interact within the reactor chamber and achieve alteration of the mechanical or chemical composition of one or more of the materials.

One example of a nozzle reactor disclosure is Canadian Patent Application No. 2,224,615 (the '615 Publication). This reference states that its disclosed nozzle reactor is designed to receive a bitumen/steam flow mixture into a single central nozzle reactor passage extending along the axial length of the nozzle reactor. The reference states that the nozzle forms a flow passageway of circular diametric cross-section having the following sections in sequence from the bitumen/steam flow mixture inlet: a first contraction section of reducing diameter for accelerating the flow and reducing the size of bitumen droplets; a diffuser section of expanding diameter to decelerate the flow and induce a shock wave; a second contraction section to accelerate the mixture more than the first contraction section; and an orifice outlet for producing an output jet or spray. The '615 Publication further states that the disclosed nozzle reactor reduces bitumen droplet size from about 12,000 µm to about 300 µm.

Among other things, the nozzle reactor of the '615 Publication receives a pre-mixed bitumen/steam liquid medium. As a result, the nozzle reactor technique of the '615 Publication requires implementation of one or more substantial pre-mixing steps in order to generate and deliver the desired bitumen/steam liquid medium to the central nozzle reactor passage. In addition, the pre-mixed liquid medium (including bitumen in the mixture) inherently yields limited velocities of the medium through the nozzle reactor.

Another example of a nozzle reactor is shown in FIG. 3 of the enclosed U.S. Patent Application Publication No. 2004/0065589 (the '589 Publication). (See FIG. 4 of the present application). The nozzle reactor discussed in the '589 Publication has two steam injectors disposed: (i) laterally separated from opposing sides of a central, axially extending vapor expansion feed stock injector, (ii) at an acute angle to the axis of the central vapor expansion feed stock injector. The steam injectors are thus disposed for ejection from the steam injectors in the direction of travel of material feed stock injected by the feed stock injector. Each of the three injectors has a discharge end feeding into a central reactor ring or tube extending coaxially from the central feed stock injector. As shown in the '589 Publication, the central feed stock injector appears as if it may have a divergent-to-convergent axial cross-section with a nearly plugged convergent end; but as shown in the enclosed related Canadian Patent Application No. 2,346,181 (the '181 Publication), the central feed stock injector has a straight-through bore. (See FIG. 5 of the present application).

As the '589 Publication explains, superheated steam is injected through the two laterally opposed steam injectors into the interior of reactor tube in order to impact a pre-heated, centrally-located feed stream of certain types of heavy hydrocarbon simultaneously injected through the vapor expansion feed stock injector into the interior of the reactor tube. (See, e.g., '589 Publication, paragraph 18.) The '589 Publication states that the object of '589 nozzle reactor is to crack the feed stream into lighter hydrocarbons through the impact of the steam feeds with the heavy hydrocarbon feed within the reactor tube. (See, e.g., id., paragraphs 29-31.) According to the '589 Publication, the types of heavy hydrocarbons processed with the '589 nozzle reactor are crude oil, atmospheric residue, and heavy distillates. (Id., paragraph 32.) With the nozzle reactors of either the '589 Publication and the '181 Publication, a central oil feed stock jet intersects the steam jets at some distance from the ejection of these jets from their respective injectors.

The applicants have discovered that, among other things, nozzle reactors of the type shown in the '589 Publication, the '181 Publication and associated methods of use: (i) are inefficient; (ii) typically and perhaps always provide only sonic or subsonic velocity of a feed stock into the associated reactor tube; and (iii) yield excessive un-cracked or insufficiently cracked heavy hydrocarbons. These same nozzle reactors also typically yield excessive coke formation and scaling of the nozzle reactor walls, reducing the efficiency of the nozzle reactor and requiring substantial effort to remove the scale formation within the nozzle reactor.

SUMMARY

Disclosed below are representative embodiments that are not intended to be limiting in any way. Instead, the present disclosure is directed toward features, aspects, and equivalents of the embodiments of the nozzle reactor and method of use described below. The disclosed features and aspects of the embodiments can be used alone or in various combinations and sub-combinations with one another.

Generally, a nozzle reactor having a variety of aspects and methods of use of a nozzle reactor are described herein. In certain embodiments, the nozzle reactor provides a hydrocarbon cracking nozzle reactor. In certain embodiments, the method includes generating a supersonic jet of material and impacting hydrocarbon material with the supersonic jet.

In one aspect of the nozzle reactor, the nozzle reactor may have a material feed passage extending into an interior reactor chamber section generally transverse to the exit or injection axis of at least one injection passage. In certain embodiments, at least one injection passage may be coaxial with the axis of an associated interior reactor chamber and at least one material feed passage may be disposed to inject material feed to impact the cracking material injected at the ejection end of the injection passage.

In another aspect, the nozzle reactor may have a injection passage abutting an interior reactor chamber and a material feed passage extending into the interior reactor chamber transverse to the axis of the injection passage and adjacent the ejection end of the injection passage. The injection passage can be a non-linear injection passage injectingly penetrating the interior reactor chamber.

In certain embodiments, the injection passage can have a cross-sectional configuration in which opposing side wall portions are curved inwardly toward the central axis of the injection passage along the axial length of the injection passage. Preferably, the curved side wall portions of the injection passage has a smooth finish without sharp edges or sudden changes in surface contour, most preferably along the entire axial length of the injection passage. In certain embodiments, the curved side wall portions of the injection passage can provide a nearly or substantially isentropic or frictionless passage for cracking material passing through the injection passage into the interior reactor chamber.

In another aspect, the nozzle reactor may include a material feed passage having at least one or more material feed ports, and if desired one or more partially or completely annular material feed ports, injectingly abutting the interior reactor chamber. In certain embodiments, a material feed passage can include a reactor chamber material feed slot injectingly penetrating at least a substantial portion, or if desired, the entire outer circumferential periphery of an annular material feed port. The latter configuration can, in the case of a completely annular material feed port for example, provide impact of the material feed stream with the entire circumference of the injected cracking material stream.

In certain embodiments, the reactor chamber material feed slot or end of the annular material feed port is disposed axially adjacent the end of the injection passage injectingly penetrating the interior reactor chamber. In this fashion, material feed can be injected through the material feed passage radially inwardly toward, and optionally transverse to, an adjacent cracking material injected through the injection passage.

In certain embodiments, the nozzle reactor may comprise an annular or other port insert member mounted intermediate the interior reactor chamber and the injection passage. The ejection port of the interior reactor chamber, opposite the injection passage, may provide a passage through which cracking material and other material may pass out of the reactor body. The injection passage may have a frustoconical configuration.

Certain embodiments of the present invention can provide a conical or stepped or telescoped interior reactor chamber, or a combined conical and otherwise shaped interior reactor chamber, extending along the axial length of the interior reactor chamber. The interior reactor chamber may be configured to generally provide interfering, turbulence-inducing contact, optionally limited contact, between the cracking material and the material feed injected into the interior reactor chamber.

In certain embodiments, the injection passage includes an insert mounted within the injection passage and has a thin-thick-thin cross-section along the axial length of the insert. The insert may have a radially outwardly curved periphery along the axial length of the insert.

Certain embodiments also can provide a method of injecting cracking material and a feed material into a nozzle reactor. Some embodiments can include injecting cracking material from an injection passage into an interior reactor chamber along the axial length of the interior reactor chamber section and injecting feed material into the interior reactor chamber transverse to the axis of the interior reactor chamber. In certain embodiments, the feed material is injected adjacent the end of the injection passage injectingly abutting the interior reactor chamber. As a result, the cracking material impacts the feed material virtually immediately after ejection from the injection passage. This impact can thus take place before the velocity of the cracking material may diminish appreciably.

In certain embodiments, cracking material can comprise superheated steam and the feed material may comprise preheated heavy hydrocarbons. The heavy hydrocarbons may include or consist largely or even essentially of bitumen. Cracking material also may comprise natural gas, carbon dioxide, or other gases.

In some embodiments, the feed material is injected to impact the cracking material upon its ejection from the injection passage, at an angle of about 90°.

In some embodiments, the bar pressure level of the superheated steam cracking material is substantially greater than, and preferably more than double, the pressure level within the interior reactor chamber.

In certain embodiments, the cracking material is injected through the injection passage into the interior reactor chamber at supersonic speeds. In some embodiments, the cracking material injection speed is twice the speed of sound or more.

Some embodiments provide reduced back flow and enhanced mechanical shear within the interior reactor chamber. Some embodiments may do so and accomplish substantial cracking of a desired hydrocarbon very quickly and generally without substantial regard to retention time of the material feeds within the reactor body. In other embodiments, increased retention time of the material feed within the reactor body may result in higher cracking rates.

Certain embodiments of the apparatus and methods provide more efficient generation and transfer of kinetic energy from a cracking material to a material feed. Some embodiments may also provide increased material processing capability and output and reduced uncracked material or other by-products in the output from the nozzle reactor or retained within the confines of the nozzle reactor, such as reduced scale formation on the side walls of the interior reactor chamber. Certain embodiments also provide a relatively economical, durable, and easy-to-maintain or repair nozzle reactor.

Some embodiments may provide mechanical cracking of heavy oils or asphaltenes. In certain of these embodiments, the cracking reaction can be caused primarily mechanically by the application of extreme shear rather than by temperature, retention time, or interaction with a catalyst. In some embodiments, the cracking may be selective, such as by selectively cracking primarily only the larger molecules making up certain heavy hydrocarbons in a hydrocarbon feed stock.

In certain embodiments, the nozzle reactor can provide not only more selective and efficient cracking of material feed but also, or alternatively, reduced coke formation and reactor chamber scaling. In some embodiments, reactor chamber scaling may even be eliminated.

In certain embodiments, a nozzle reactor system is disclosed. The nozzle reactor system may generally comprise a first nozzle reactor and a second nozzle reactor. Each of the first nozzle reactor and the second nozzle reactor may be a nozzle reactor as described herein. The nozzle reactor system may also comprise a first separation unit. The first separation unit may be in fluid communication with an ejection end of the first nozzle reactor such that material leaving the nozzle reactor may flow into the separation unit. The first separation unit may comprise a light stream outlet and a heavy stream outlet. The heavy stream outlet may be in fluid communication with the material feed passage of the second nozzle reactor such that the heavy stream may be injected into the nozzle reactor for further cracking.

In certain embodiments, a feed material cracking method is disclosed. The method may comprise a step of injecting a first stream of cracking material through a injection passage of a first nozzle reactor into an interior reaction chamber of a first nozzle reactor The method may further comprise a step of injecting a material feed into the interior reactor chamber of the first nozzle reactor adjacent to the injection passage of the first nozzle reactor and transverse to the first stream of cracking material entering the interior reactor chamber of the first nozzle reactor from the injection passage of the first nozzle reactor to produce first light material and first heavy material. The method may also include a step of injecting a second stream of cracking material through an injection passage of a second nozzle reactor into a reaction chamber of a second nozzle reactor. Finally, the method may include a step of injecting the first heavy material into the interior reactor chamber of the second nozzle reactor adjacent to the injection passage of the second nozzle reactor and transverse to the second stream of cracking material entering the interior reactor chamber of the second nozzle reactor from the injection passage of the second nozzle reactor to thereby produce second light material and second heavy material.

The foregoing and other features and advantages of the present application will become more apparent from the following detailed description, which proceeds with reference to the accompanying figures. In this regard, it is to be understood that the scope of the invention is to be determined by the claims as issued and not by whether given subject includes any or all features or aspects noted in this Summary or addresses any issues noted in the Background.

DETAILED DESCRIPTION

Before describing the details of the various embodiments herein, it should be appreciated that the term "hydrocarbon" and "hydrocarbons" as used herein may include organic material besides hydrogen and carbon, such as vanadyl, sulfur, nitrogen, and any other organic compound that may be in oil.

Figure 1:
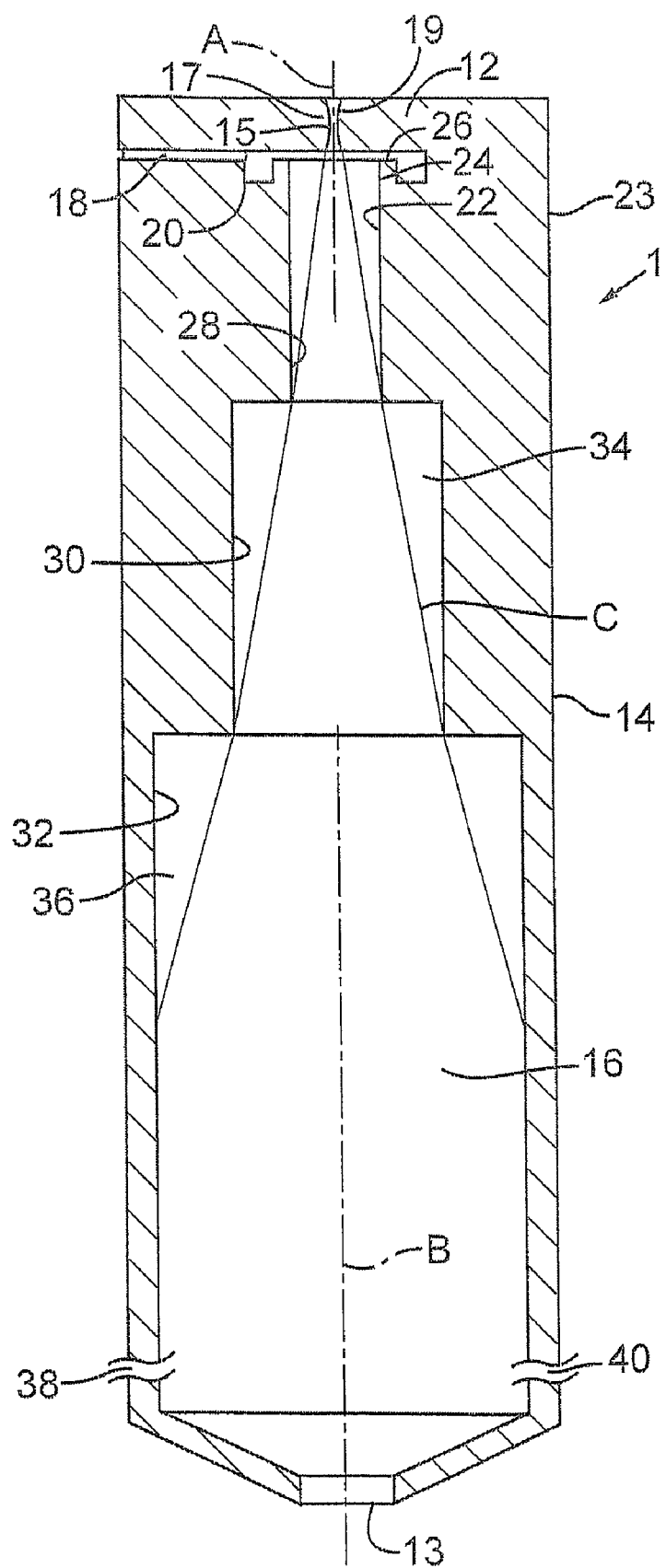
FIG. 1 is a cross-sectional, schematic view of one embodiment of a nozzle reactor.

With reference to FIG. 1, the nozzle reactor, indicated generally at 10, has a reactor body injection end 12, a reactor body 14 extending from the reactor body injection end 12, and an ejection port 13 in the reactor body 14 opposite its injection end 12. The reactor body injection end 12 includes an injection passage 15 extending into the interior reaction chamber 16 of the reactor body 14. The central axis A of the injection passage 15 is coaxial with the central axis B of the interior reactor chamber 16.

With continuing reference to FIG. 1, the injection passage 15 has a circular diametric cross-section and, as shown in the axially-extending cross-sectional view of FIG. 1, opposing inwardly curved side wall portions 17, 19 (i.e., curved inwardly toward the central axis A of the injection passage 15) extending along the axial length of the injection passage 15. In certain embodiments, the axially inwardly curved side wall portions 17, 19 of the injection passage 15 allow for a higher speed of injection gas when passing through the injection passage 15 into the interior reactor chamber 16.

In certain embodiments, the side wall of the injection passage 15 can provide one or more among: (i) uniform axial acceleration of cracking material passing through the injection passage; (ii) minimal radial acceleration of such material; (iii) a smooth finish; (iv) absence of sharp edges; and (v) absence of sudden or sharp changes in direction. The side wall configuration can render the injection passage 15 substantially isentropic. These latter types of side wall and injection passage 15 features can be, among other things, particularly useful for pilot plant nozzle reactors of minimal size.

A material feed passage 18 extends from the exterior of the reactor body 14 toward the interior reactor chamber 16 transversely to the axis B of the interior reactor chamber 16. The material feed passage 18 penetrates an annular material feed port 20 adjacent the interior reactor chamber wall 22 at the interior reactor chamber injection end 24 abutting the reactor body injection end 12. The material feed port 20 includes an annular, radially extending reactor chamber feed slot 26 in material-injecting communication with the interior reactor chamber 16. The material feed port 20 is thus configured to inject feed material: (i) at about a 90° angle to the axis of travel of cracking material injected from the injection passage 15; (ii) around the entire circumference of a cracking material injected through the injection passage 15; and (iii) to impact the entire circumference of the free cracking material stream virtually immediately upon its emission from the injection passage 15 into the interior reactor chamber 16.

The annular material feed port 20 may have a U-shaped or C-shaped cross-section among others. In certain embodiments, the annular material feed port 20 may be open to the interior reactor chamber 16, with no arms or barrier in the path of fluid flow from the material feed passage 18 toward the interior reactor chamber 16. The junction of the annular material feed port 20 and material feed passage 18 can have a radiused cross-section.

In alternative embodiments, the material feed passage 18, annular material feed port 20, and/or injection passage 15 may have differing orientations and configurations, and there can be more than one material feed port and associated structure. Similarly, in certain embodiments the injection passage 15 may be located on or in the interior reactor chamber side 23 (and if desired may include an annular cracking material port) rather than at the reactor body injection end 12 of the reactor body 14, and the annular material feed port 20 may be non-annular and located at the reactor body injection end 12 of the reactor body 14.

In the embodiment of FIG. 1, the interior reactor chamber 16 can be bounded by stepped, telescoping side walls 28, 30, 32 extending along the axial length of the reactor body 14. In certain embodiments, the stepped side walls 28, 30, 32 are configured to: (i) allow a free jet of injected cracking material, such as superheated steam, natural gas, carbon dioxide, or other gas, to travel generally along and within the conical jet path C generated by the injection passage 15 along the axis B of the interior reactor chamber 16, while (ii) reducing the size or involvement of back flow areas, e.g., 34, 36, outside the conical or expanding jet path C, thereby forcing increased contact between the high speed cracking material jet stream within the conical jet path C and feed material, such as heavy hydrocarbons, injected through the annular material feed port 20.

As indicated by the drawing gaps 38, 40 in the embodiment of FIG. 1, the reactor body 14 has an axial length (along axis B) that is much greater than its width. In the FIG. 1 embodiment, exemplary length-to-width ratios are typically in the range of 2 to 4 or more.

The dimensions of the various components of the nozzle reactor shown in FIG. 1 are not limited, and may generally be adjusted based on the amount of material feed to be cracked inside the nozzle reactor. Table 1 provides exemplary dimensions for the various components of the nozzle reactor based on the hydrocarbon input in barrels per day (BPD).

TABLE 1

| Nozzle Reactor Component (mm) | Material Feed Input (BPD) | | |
| --- | --- | --- | --- |
| | 5,000 | 10,000 | 20,000 |
| Injection Passage, Enlarged Volume Injection Section Diameter | 148 | 207 | 295 |
| Injection Passage, Reduced Volume Mid-Section Diameter | 50 | 70 | 101 |
| Injection Passage, Enlarged Volume Ejection Section Diameter | 105 | 147 | 210 |
| Injection Passage Length | 600 | 840 | 1,200 |
| Interior Reactor Chamber Injection End Diameter | 187 | 262 | 375 |
| Interior Reactor Chamber Ejection End Diameter | 1,231 | 1,435 | 1,821 |
| Interior Reactor Chamber Length | 6,400 | 7,160 | 8,800 |
| Overall Nozzle Reactor Length | 7,000 | 8,000 | 10,000 |
| Overall Nozzle Reactor Outside Diameter | 1,300 | 1,600 | 2,000 |

Figure 2:
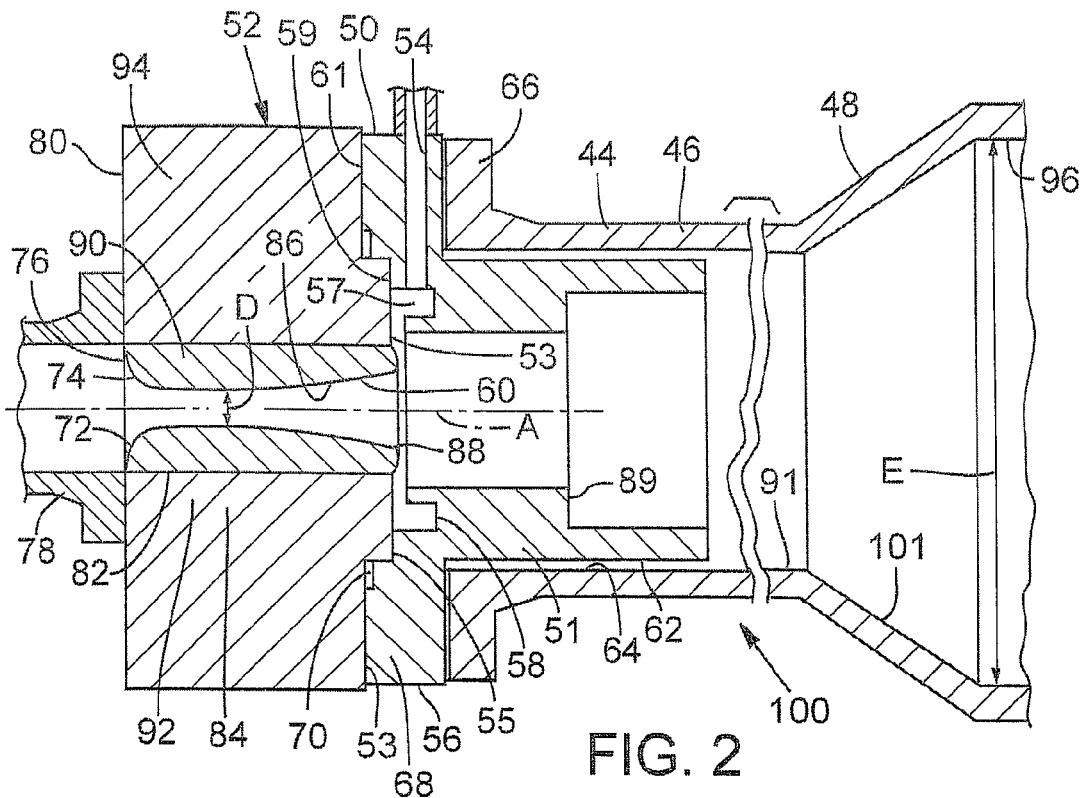
FIG. 2 is a cross-sectional view of the nozzle reactor of FIG. 1, showing further construction details for the nozzle reactor.

With reference now to FIG. 2 and the particular embodiment shown therein, the reactor body 44 includes a generally tubular central section 46 and a frustoconical ejection end 48 extending from the central section 46 opposite an insert end 50 of the central section 46, with the insert end 50 in turn abutting the injection nozzle 52. The insert end 50 of the central section 46 consists of a generally tubular central body 51. The central body 51 has a tubular material feed passage 54 extending from the external periphery 56 of the insert end 50 radially inwardly to injectingly communicate with the annular circumferential feed port depression or channel 58 in the otherwise planar, radially inwardly extending portion 59 of the axially stepped face 61 of the insert end 50. The inwardly extending portion 59 abuts the planar radially internally extending portion 53 of a matingly stepped face 55 of the injection nozzle 52. The feed port channel 58 and axially opposed radially internally extending portion 53 of the injection nozzle 52 cooperatively provide an annular feed port 57 disposed transversely laterally, or radially outwardly, from the axis A of a preferably non-linear injection passage 60 in the injection nozzle 52.

The tubular body 51 of the insert end 50 is secured within and adjacent the interior periphery 64 of the reactor body 44. The mechanism for securing the insert end 50 in this position may consist of an axially-extending nut-and-bolt arrangement (not shown) penetrating co-linearly mating passages (not shown) in: (i) an upper radially extending lip 66 on the reactor body 44; (ii) an abutting, radially outwardly extending thickened neck section 68 on the insert end 50; and (iii) in turn, the abutting injector nozzle 52. Other mechanisms for securing the insert end 50 within the reactor body 44 may include a press fit (not shown) or mating threads (not shown) on the outer periphery 62 of the tubular body 51 and on the inner periphery 64 of the reactor body 44. Seals, e.g., 70, may be mounted as desired between, for example, the radially extending lip 66 and the abutting the neck section 68 and the neck section 68 and the abutting injector nozzle 52.

The non-linear injection passage 60 has, from an axially-extending cross-sectional perspective, mating, radially inwardly curved opposing side wall sections 72, 74 extending along the axial length of the non-linear injection passage 60. The entry end 76 of injection passage 60 provides a rounded circumferential face abutting an injection feed tube 78, which can be bolted (not shown) to the mating planar, radially outwardly extending distal face 80 on the injection nozzle 52.

In the embodiment of FIG. 2, the injection passage 60 is a DeLaval type of nozzle and has an axially convergent section 82 abutting an intermediate relatively narrower throat section 84, which in turn abuts an axially divergent section 86. The injection passage 60 also has a circular diametric cross-section (i.e., in cross-sectional view perpendicular to the axis of the nozzle passage) all along its axial length. In certain embodiments, the injection passage 60 may also present a somewhat roundly curved thick 82, less curved thicker 84, and relatively even less curved and more gently sloped relatively thin 86 axially extending cross-sectional configuration from the entry end 76 to the injection end 88 of the injection passage 60 in the injection nozzle 52.

The injection passage 60 can thus be configured to present a substantially isentropic or frictionless configuration for the injection nozzle 52. This configuration may vary, however, depending on the application involved in order to yield a substantially isentropic configuration for the application.

The injection passage 60 is formed in a replaceable injection nozzle insert 90 press-fit or threaded into a mating injection nozzle mounting passage 92 extending axially through an injection nozzle body 94 of the injection nozzle 52. The injection nozzle insert 90 is preferably made of hardened steel alloy, and the balance of the nozzle reactor 100 components other than seals, if any, are preferably made of steel or stainless steel.

In the particular embodiment shown in FIG. 2, the diameter D within the injection passage 60 is 140 mm. The diameter E of the ejection passage opening 96 in the ejection end 48 of the reactor body 44 is 2.2 meters. The axial length of the reactor body 44, from the injection end 88 of the injector passage 60 to the ejection passage opening 96, is 10 meters.

The interior peripheries 89, 91 of the insert end 50 and the tubular central section 46, respectively, cooperatively provide a stepped or telescoped structure expanding radially outwardly from the injection end 88 of the injection passage 60 toward the frustoconical end 48 of the reactor body 44. The particular dimensions of the various components, however, will vary based on the particular application for the nozzle reactor, generally 100. Factors taken into account in determining the particular dimensions include the physical properties of the cracking gas (density, enthalpy, entropy, heat capacity, etc.) and the pressure ratio from the entry end 76 to the injection end 88 of the injection passage 60.

The embodiment of FIG. 2 may be used to, for example, crack heavy hydrocarbon material, including bitumen if desired, into lighter hydrocarbons and other components. In order to do so in certain embodiments, superheated steam (not shown) is injected into the injection passage 60. The pressure differential from the entry end 76, where the pressure is relatively high, to the ejection end 88, where the pressure is relatively lower, aids in accelerating the superheated steam through the injection passage 60.

In certain embodiments having one or more non-linear cracking material injection passages, e.g., 60, such as the convergent/divergent configuration of FIG. 2, the pressure differential can yield a steady increase in the kinetic energy of the cracking material as it moves along the axial length of the cracking material injection passage(s) 60. The cracking material may thereby eject from the ejection end 88 of the injection passage 60 into the interior of the reactor body 44 at supersonic speed with a commensurately relatively high level of kinetic energy. In these embodiments, the level of kinetic energy of the supersonic discharge cracking material is therefore greater than can be achieved by certain prior art straight-through injectors or other injectors such as the convergent, divergent, convergent nozzle reactor of the '615 Publication.

Other embodiments of a cracking material injection passage may not be as isentropic but may provide a substantial increase in the speed and kinetic energy of the cracking material as it moves through the injection passage 60. For example, an injection passage 60 may comprise a series of conical or toroidal sections (not shown) to provide varying cracking material acceleration through the passage 60 and, in certain embodiments, supersonic discharge of the cracking material from the passage 60.

In certain methods of use of the nozzle reactor embodiment illustrated in FIG. 2, heavy hydrocarbon feed stock (not shown) is pre-heated, for example at 2-15 bar, which is generally the same pressure as that in the reactor body 44. In the case of bitumen feed stock, the preheat should provide a feed stock temperature of 300 to 500°, and most advantageously 400 to 450° C. Contemporaneously, the preheated feed stock is injected into the material feed passage 54 and then through the mating annular feed port 57. The feed stock thereby travels radially inwardly to impact a transversely (i.e., axially) traveling high speed cracking material jet (for example, steam, natural gas, carbon dioxide or other gas not shown) virtually immediately upon its ejection from the ejection end 88 of the injection passage 60. The collision of the radially injected feed stock with the axially traveling high speed steam jet delivers kinetic energy to the feed stock. The applicants believe that this process may continue, but with diminished intensity and productivity, through the length of the reactor body 44 as injected feed stock is forced along the axis of the reactor body 44 and yet constrained from avoiding contact with the jet stream by the telescoping interior walls, e.g., 89, 91 101, of the reactor body 44. Depending on the nature of the feed stock and its pre-feed treatment, differing results can be procured, such as cracking of heavy hydrocarbons, including bitumen, into lighter hydrocarbons and, if present in the heavy hydrocarbons or injected material, other materials.

Figure 3:
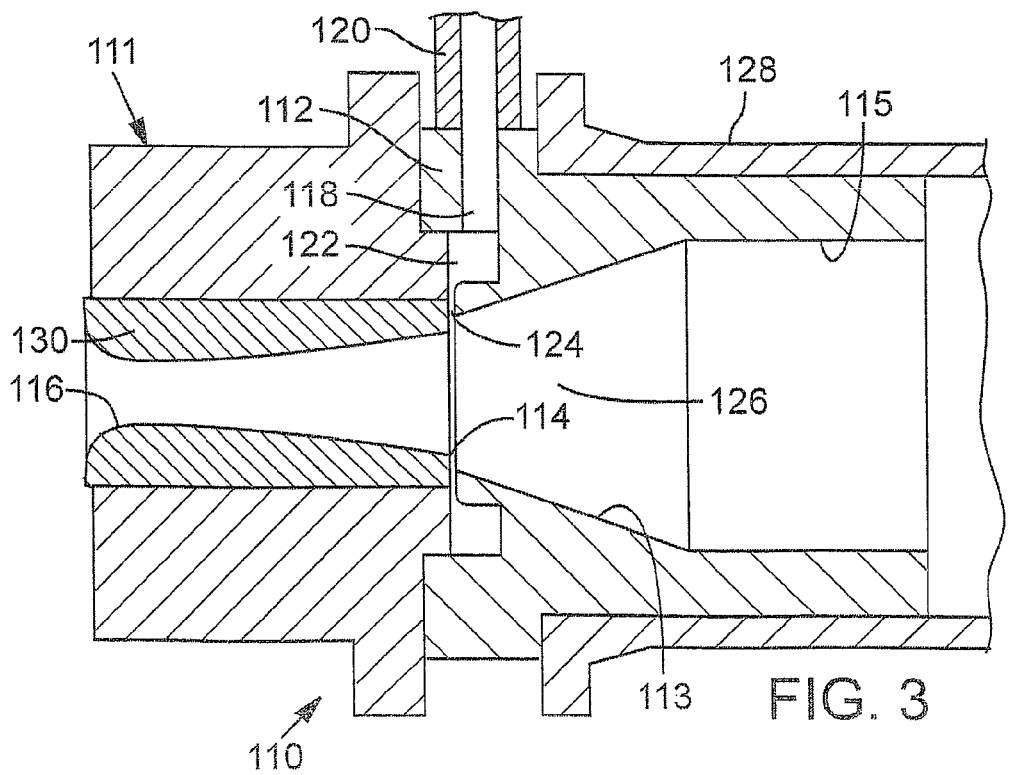
FIG. 3 is a cross-sectional view of an alternative embodiment of a nozzle reactor.

With reference now to FIG. 3, an alternative embodiment of the nozzle reactor, generally 110, has a nozzle 111 and a reactor body 128 with an insert end 112 intermediate the reactor body 128 injector insert 130. The insert end 112 has a conical interior periphery section 113 that: (i) extends, and expands outwardly, from the injection end 114 of the injection passage 116 of the nozzle 111; and (ii) terminates with a maximum diameter at the abutting tubular interior periphery section 115 of the insert end 112 opposite the ejection end 114 of the injection passage 116. This alternative embodiment also has a feed material injection passage 118 formed of a material feed line or tube 120 in communication with an annular material feed distribution channel 122, which in turn is in communication with an axially narrower annular material feed injection ring or port 124. The material feed injection ring 124 is laterally adjacent the ejection end 114 of the injection passage 116 to radially inwardly inject material feed stock, such as bitumen or other hydrocarbons (not shown) for example, into contact with axially injected cracking gas (not shown) virtually immediately upon the ejection of the cracking gas from the ejection end 114 into the interior 126 of the reactor body 128.

The injection passage 116 can be configured to eject a free stream of cracking material, such as super-heated steam (not shown) for example, generally conically with an included angle of about 18°. The conical interior section 113 may be configured to surround or interfere with such a free stream of cracking material ejection stream. In certain such embodiments, after engaging the injected material feed stock adjacent the ejection end 114, the resulting jet mixture—a mixture of cracking material and material feed stock—preferably makes at least intermittent interrupting contact with the tubular interior section 113 and, if desired, the downstream tubular interior section 115. This intermittent, interrupting contact increases turbulence and concentrates shear stresses into an axially shortened reaction zone within the reactor body 128. Preferably, however, the jet mixture travels through the interior 126 of the reactor body 128 with minimal backflow of any components of the jet mixture, resulting in more rapid plug flow of all jet mixture components through the reactor body 128.

Once the material feed stock is cracked by the cracking material ejection stream adjacent the injection end 114, the configuration of the reactor body facilitates substantially immediate cooling of the jet mixture. This cooling of the jet mixture acts to arrest the chemical reaction between the material feed stock and the cracking material ejection stream.

The applicants believe that, in certain embodiments, sufficient steam cracking of at least certain heavy hydrocarbons may be achieved at jet velocities above about 300 meters per second while the retention time in the reactor body zone providing such extreme shear can be very short, on the order of only about 0.01 seconds. In such embodiments, cracking of material feed stock, such as bitumen for example, can be caused by extreme shear of the cracking gas. In certain of these types of embodiments, the retention time of the material feed or cracking gas in the reactor body 128 therefore can have little or no impact on such cracking or, if desired, any other substantial cracking. In other embodiments, an increased retention time of the material feed or cracking gas in the reactor body 128 may result in increased cracking rates.

In some embodiments, a catalyst can be introduced into the nozzle reactor to enhance cracking of the material feed stock by the cracking gas ejection stream.

In the applicant's view, the methodology of nozzles of the type shown in the illustrated embodiments, to inject a cracking gas such as steam, can be based on the following equation $$KE_1 = H_1 - H_0 + KE_0 \quad (1)$$

where $KE_1$ is the kinetic energy of the cracking material (referred to as the free jet) immediately upon emission from an injection nozzle, $H_0$ is the enthalpy of cracking material upon entry into the injection nozzle, $H_1$ is the enthalpy of cracking material upon emission from the injection nozzle, and $KE_0$ is the kinetic energy of the cracking material at the inlet of the nozzle.

This equation derives from the first law of thermodynamics—that regarding the conservation of energy—in which the types of energy to be considered include: potential energy, kinetic energy, chemical energy, thermal energy, and work energy. In the case of the use of the nozzles of the illustrated embodiments to inject steam, the only significantly pertinent types of energy are kinetic energy and thermal energy. The others—potential, chemical, and work energy—can be zero or low enough to be disregarded. Also, the inlet kinetic energy can be low enough to be disregarded. Thus, the resulting kinetic energy of the cracking material as set forth in the above equation is simplified to the change in enthalpy ΔH.

The second law of thermodynamics—an expression of the universal law of increasing entropy, stating that the entropy of an isolated system that is not in equilibrium will tend to increase over time, approaching a maximum value at equilibrium—means that no real process is perfectly isentropic. However, a practically isentropic nozzle (i.e., a nozzle commonly referred to as "isentropic" in the art) is one in which the increase in entropy through the nozzle results in a relatively complete or very high conversion of thermal energy into kinetic energy. On the other hand, non-isentropic nozzles such as a straight-bore nozzle not only result in much less efficiency in conversion of thermal energy into kinetic energy but also can impose upper limits on the amount of kinetic energy available from them.

For example, since the velocity of an ideal gas through a nozzle is represented by the equation $$V = (-2\Delta H)^{1/2} \quad (2)$$

and the velocity in a straight-bore nozzle is limited to the speed of sound, the kinetic energy of a gas jet delivered by a straight-bore nozzle is limited. However, a practically "isentropic" converging/diverging nozzle, such as shown in FIGS. 1-3 and 6-9, can yield, i.e., eject, a gas jet that is supersonic. Consequently, the kinetic energy of the gas jet delivered by such an isentropic converging/diverging nozzle can be substantially greater than that of the straight-bore nozzle, such as that shown in the '181 Publication.

It can thus be seen that certain embodiments disclosed above can provide a nozzle reactor providing enhanced transfer of kinetic energy to the material feed stock through many aspects such as, for example, by providing a supersonic cracking gas jet, improved orientation of the direction of flow of a cracking gas (or cracking gas mixture) with respect to that of the material feed stock, and/or more complete cracking gas stream impact with the material feed stock as a result of, for example, an annular material feed port and the telescoped reactor body interior. Certain embodiments also can result in reduced retention of by-products, such as coking, on the side walls of the reactor chamber. Embodiments of the nozzle reactor can also be relatively rapid in operation, efficient, reliable, easy to maintain and repair, and relatively economical to make and use.

It should be noted that, in certain embodiments including in conjunction with the embodiments shown in FIGS. 1-3 above, the injection material may comprise a cracking fluid or other motive material rather than, or in addition to, a cracking gas. Accordingly, it is to be understood that certain embodiments may utilize components that comprise motive material compatible components rather than, as described in particular embodiments above, cracking material compatible components such as, for example, the injection passage, e.g., 60, referenced above. When utilized in conjunction with an inwardly narrowed motive material injection passage, however, the motive material preferably is compressible.

Figures 4, 5:
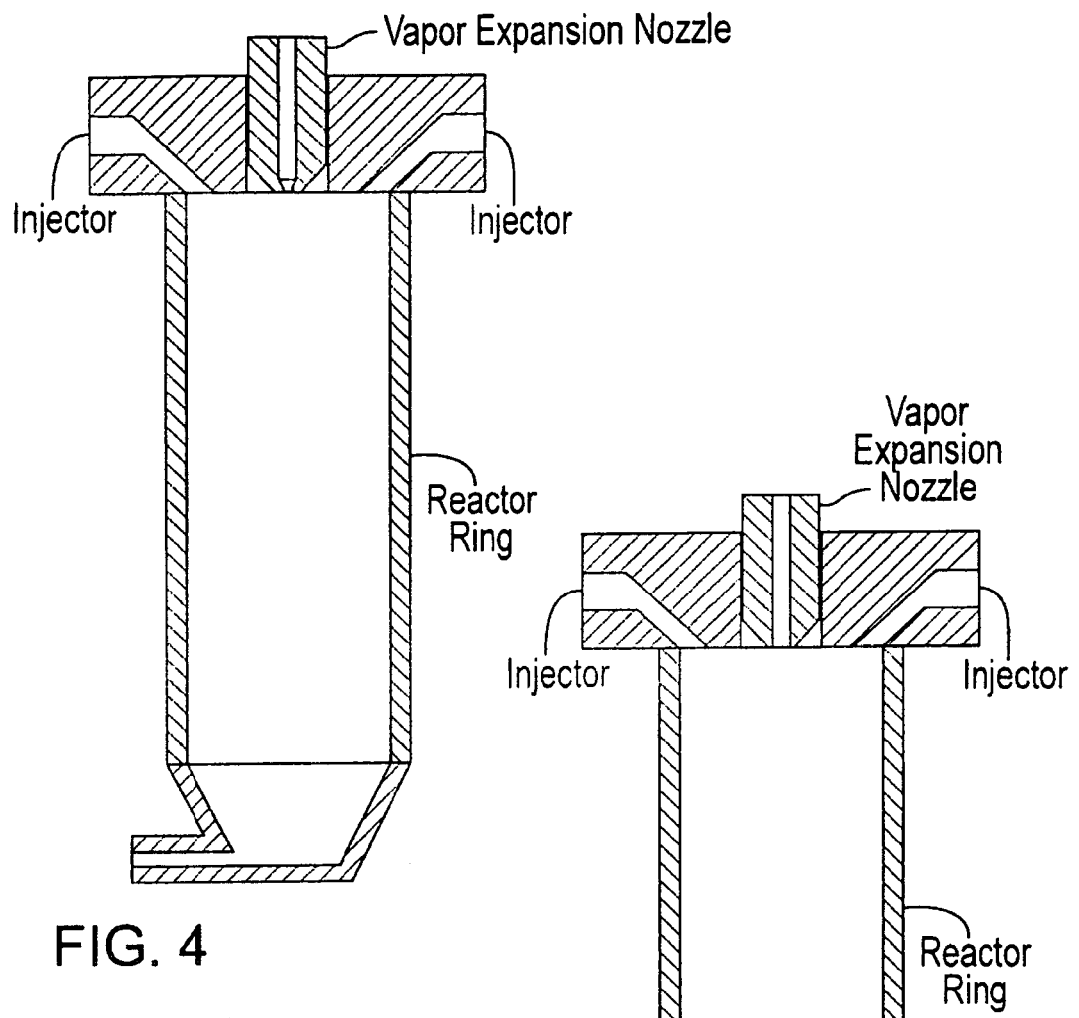
FIG. 4 is the nozzle reactor shown in FIG. 3 of the '589 Publication.
FIG. 5 is the nozzle reactor shown in FIG. 3 of the '181 Publication.

The applicants believe that a non-linear injector passage nozzle reactor embodiment (as generally shown in FIG. 1) and a linear injector passage nozzle reactor one inch in axial length (configured as generally shown in FIG. 4) provide the following theoretical results for 30 bar steam cracking material supplied at 660° C. with interior reactor chamber pressures of 10 bar and 3 bar as shown. For both of these types of nozzle reactors, however, the injector passage configurations must be changed (by varying the position of the throat 84 and the diameter of the discharge or injection end 88) in order to deliver 2 barrels per day (water volume) of steam at 10 bars and 3 bars. The results listed in Table 2 are based on the assumption of perfect gas behavior and the use of k ($C_p/C_v$, ratio of specific heats).

TABLE 2

|  | Straight-Through Injector Nozzle reactor | | Convergent/Divergent Injection | |
| --- | --- | --- | --- | --- |
|  | 10 bar | 3 bar | 10 bar | 3 bar |
| Throat Diameter, mm | 1.60 | 2.80 | 1.20 | 1.20 |
| Steam Temp., ° C. | 560.0 | 544.3 | 464.4 | 296.7 |
| Steam Velocity, m/s | 647.1 | 690.0 | 914.1 | 1244.1 |
| Mach Number | 0.93 | 1.00 | 1.39 | 2.12 |
| Kinetic energy, kW | 0.72 | 1.12 | 1.43 | 2.64 |

As can be seen from the results of applicants' calculations above, the theoretically tested straight-through injection passage nozzle reactors of the prior art theoretically provide steam jet velocity at, or less than, the speed of sound. In contrast, the theoretically tested convergent/divergent injection passage nozzle reactors of the present application theoretically can provide a steam jet velocity in the interior reactor chamber well in excess of the speed of sound and, at 3 bar interior reactor chamber pressure, in excess of twice the speed of sound. Similarly and as a result, the associated kinetic energies of steam jets of the convergent/divergent injection passage nozzle reactors are theoretically significantly greater than the associated kinetic energies of the steam jets of the linear injection passage nozzle reactors.

The applicants therefore believe that the theoretically tested convergent/divergent injection passage nozzle reactors of the present application, such as nozzle 111 of FIG. 3, are significantly closer to isentropic than the theoretically tested straight-through injection passage nozzle reactor. As shown by the theoretical kinetic energy data above, the applicants also believe that the theoretically tested convergent/divergent injection passage nozzle reactors can be 2 to 2.5 times more efficient than the theoretically tested straight-through injection passage nozzle reactors identified above. The above theoretical results were obtained using steam as the cracking material and therefore, are based on thermodynamic properties of steam. However, similar theoretical results can be obtained using other gaseous motive fluids as the cracking gas.

Similarly, the kinetic energies of cracking gas jet of the convergent/divergent injection passage nozzle reactors can also be significantly greater than the associated kinetic energies of the medium of the convergent/divergent/convergent injection passage of the type disclosed in the '615 Publication.

In the convergent/divergent/convergent injection passage of the '615 Publication, however, the velocity and kinetic energy of the bitumen/steam medium is designed to substantially decrease at least via the second convergent section, thus diminishing the ultimate velocity and kinetic energy of the medium when ejected from the '615 Publication's nozzle reactor. In addition, the '615 Publication's use of a mixed bitumen/steam medium itself reduces the velocity of the medium as compared to the velocities, and resulting shear, attainable by injection of separate steam and pre-heated bitumen feeds, for example.

Figure 6:
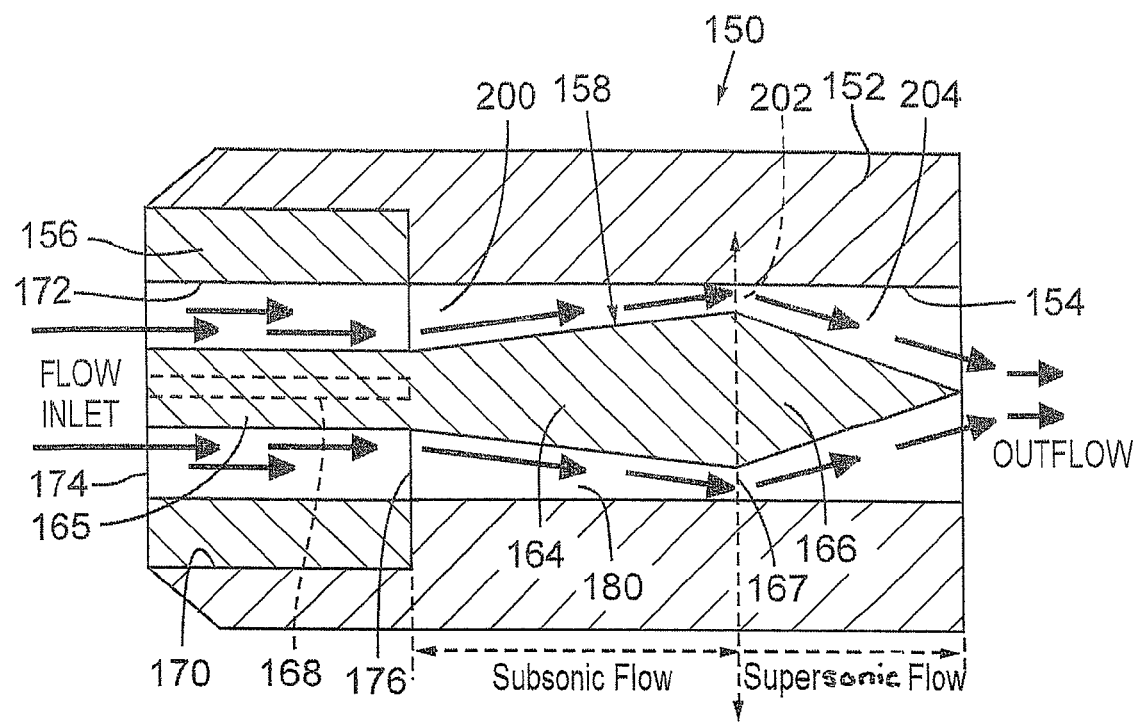
FIG. 6 is a cross-sectional, schematic view of one embodiment of an injection nozzle for use with a nozzle reactor.
Figure 7:
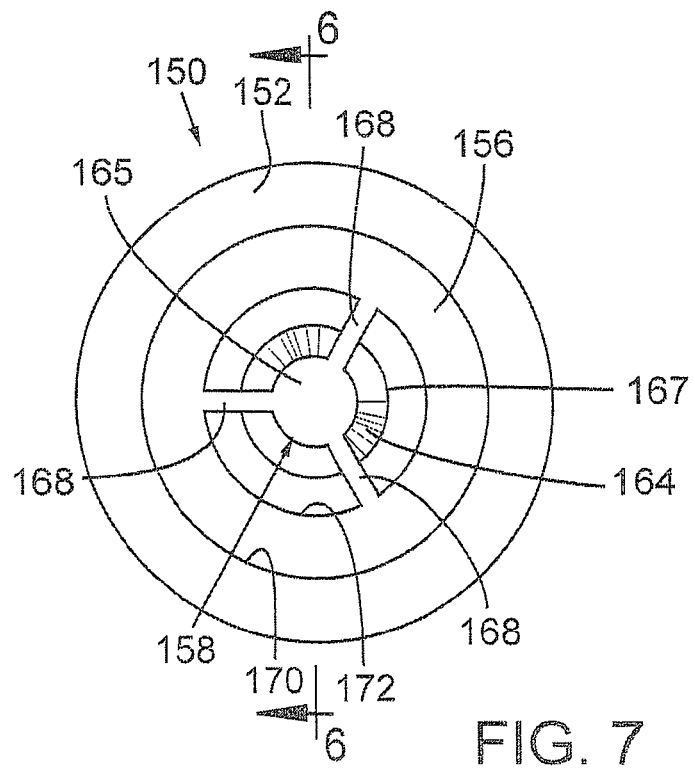
FIG. 7 is an end view of the injection nozzle of FIG. 6 taken from the inlet end of the nozzle.

In some embodiments, a nozzle reactor of the present application can include an injection passage that has a flow directing insert around which a first material can flow to increase the velocity of the first material in preparation for an interaction with a second material to alter the mechanical or chemical composition of the first and/or second materials. For example, as shown in FIGS. 6 and 7, an injection nozzle 150 includes an injection nozzle body 152 having an injection passage 154 extending axially through the body. In certain implementations, the passage 154 has a constant diameter along the axial length of the passage. In other implementations, the diameter of the passage 154 varies, such as decreasing along the axial length of the passage, i.e., narrowing of the passage, or increasing along the axial length of the passage, i.e., widening of the passage, or various combinations of both. A flow directing insert 166 is positioned within the injection passage 154, but remains out of direct contact with the inner surface of the injection passage through use of a supporting insert 156. The flow directing insert 166 can be coupled to the supporting insert 156, which is inserted and secured within a mating supporting insert recess 170 formed in the injection nozzle body 152.

The supporting insert 156 can include one or more support rods 168 connected to a cylindrical portion 165 of the flow directing insert 166. The cylindrical portion 165 includes outer peripheral surfaces that run parallel to the axis of the insert 156. The supporting insert 156 comprises a generally annular shaped fluid flow passage 172 corresponding to the injection passage 154 of the injection nozzle body 152 such that when inserted in the recess 170, the interior periphery of the passage 172 is generally flush with the interior periphery of passage 154. Cross-sectional areas of the fluid flow passage 172 on planes perpendicular to the axis of the fluid flow passage 172 remain substantially the same extending the axial length of the passage 172. In other words, an outer diameter and inner diameter of the fluid flow passage 172 remain generally unchanged throughout the passage.

In some implementations, the inserts 156, 158 are replaceable. In specific implementations, the insert 156, with insert 158 secured thereto, can include external threads and can be removably secured within the mating supporting insert recess 170 by threadably engaging internal threads formed in the recess. In other specific implementations, the insert 158 is press-fit into the recess 170. Yet in other implementations, the insert 156 is bonded to the recess 170 by applying a bonding material, such as a heat-activated adhesive, pressure-activated adhesive, pressure-activated adhesive, or other similar adhesive, between the outer periphery of the insert and the recess, and activating the bonding material.

Fluid, such as cracking gas, is allowed to flow through the nozzle 150 by first passing through a flow inlet opening 174 in the supporting insert 156, the fluid flow passage 172 and a flow outlet opening 176 in the supporting insert. As shown in FIG. 6, the fluid flows around the cylindrical portion 165 and the support rods 168 as it flows through the fluid flow passage 172 at a generally constant velocity. Preferably, the number and cross-sectional area of the support rods 168 are minimized so as not to substantially disrupt the flow of fluid through the fluid flow passage 172.

When the flow directing insert is positioned within the injection passage 154, a generally annular fluid flow passage 180, defined between the surface of the injection passage and the exterior surface of the flow directing insert 158, is formed.

The flow directing insert 158 comprises a diverging, or expanding, portion 164, a converging, or contracting, portion 166 and a transitioning portion 167 coupling the diverging and converging portions. In the illustrated embodiments, the diverging and converging portions 164, 166 are generally frustoconically shaped and conically shaped, respectively, with abutting base surfaces proximate the transitioning portion 167. The diameter of the diverging portion increases and the diameter of the converging portion decreases along the axial length of the flow directing insert 158 in the fluid flow direction as indicated in FIG. 6. Accordingly, the annular fluid flow passage 180 between the diverging portion 164 of the flow directing insert 158 and the outer periphery of the injection passage 154, i.e., converging region 200, narrows in the fluid flow direction and the annular fluid flow passage between the converging portion 166 of the flow direction insert and the outer periphery of the injection passage, i.e., diverging region 204, widens in the fluid flow direction. As can be recognized, the annular fluid flow passage 180 is most narrow between the transition portion 167 of the insert 158 and the outer periphery of the injection passage 154, i.e., transition, or throat, region 202.

Fluid flowing through the fluid flow passage 172 in the supporting insert 156 exits through the outlet opening 176 of the passage 172 and into the annular fluid flow passage 180. The nozzle can be configured such that fluid flowing through the fluid flow passage 172 and into the annular fluid flow passage 180 flows at a velocity less than the speed of sound, i.e., subsonic flow. As the fluid flows through the fluid flow passage 180, the narrowing of the converging region and the widening of the diverging region help to induce a back pressure, i.e., pressure is higher at the entry of the passage 180 than at the exit of the passage, which increases the velocity of the fluid. The fluid velocity can be increased such that as the fluid exits the transition region its velocity is at or above the speed of sound, i.e., supersonic flow. The fluid remains at supersonic flow through the diverging region and as it exits the nozzle 150 at the end of the diverging region.

Like the reactor body injection end 12 of FIG. 1, the injection nozzle 52 of FIG. 2 and the reactor body injection insert 130 of FIG. 3, the nozzle 150 can be coupled to a reactor chamber. Further, the fluid flowing through the nozzle can be a cracking material that, upon exiting from the nozzle, immediately contacts radially inwardly injected material feed stock proximate the nozzle exit to induce interaction between the cracking material and the material feed.

Figure 8:
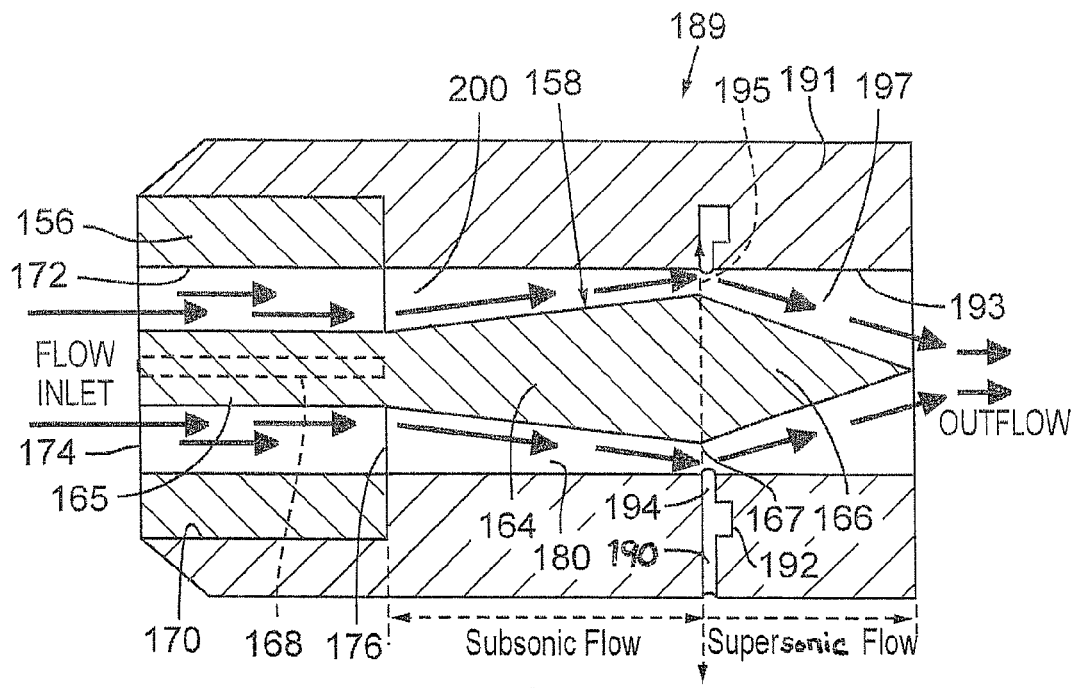
FIG. 8 is a cross-sectional, schematic view of one embodiment of an injection nozzle for use with a nozzle reactor, with the nozzle having a material feed injection passage formed in the nozzle body.

Alternatively, as shown in FIG. 8, a feed material injection passage 190 that extends from an exterior of injection nozzle body 191 toward the injection passage 193. The material feed injection passage 190 penetrates an annular material feed port 192 adjacent the outer periphery of the injection passage 193 proximate transition region 195. The annular material feed port 192 includes an annular, radially extending chamber feed slot 194 in material-injecting communication with an exit of the transition region 195. Similar to FIG. 1, the feed port 192 is configured to inject feed material: (i) at about a 90° angle to the axis of travel of cracking gas flowing through the transition region 195; (ii) around the entire circumference of cracking gas flowing out of the transition region; and (iii) to impact the entire circumference of the free cracking gas virtually immediately upon its emission from the transition region into diverging region 197.

Figure 9:
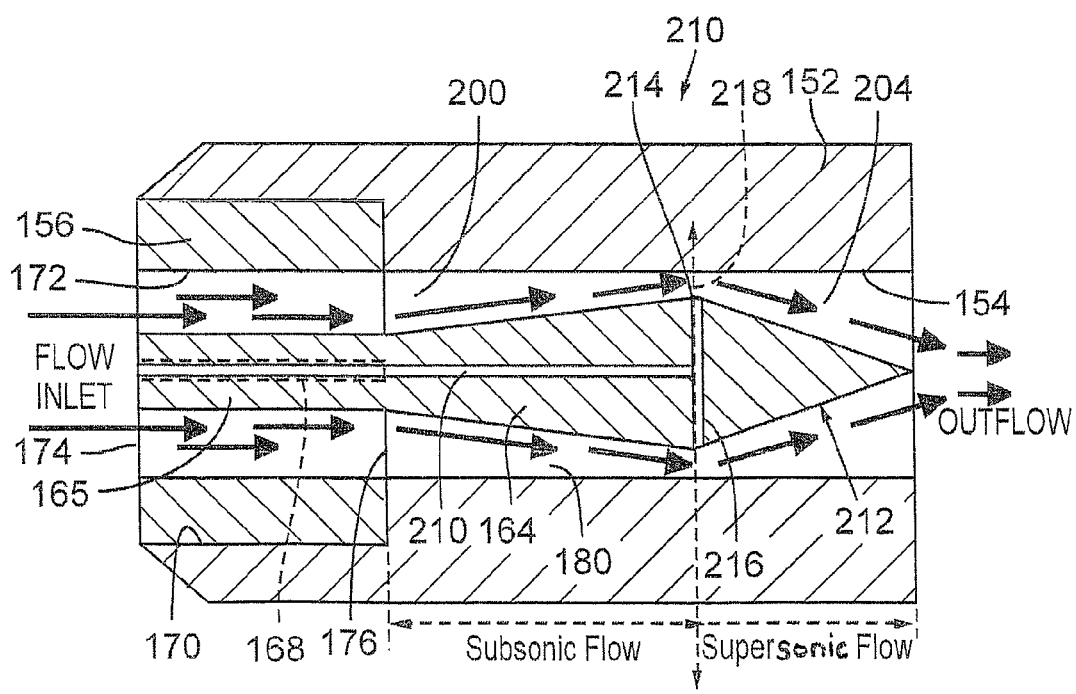
FIG. 9 is a cross-sectional, schematic view of one embodiment of an injection nozzle for use with a nozzle reactor, with the nozzle having a material feed injection passage formed in the flow directing insert.

Now referring to FIG. 9, nozzle 210 is similar to the nozzle 150 of FIGS. 6 and 7 and nozzle 189 of FIG. 8, except that feed material injection passage 210 is formed in the flow directing insert 212 and axially extends from an end of the flow directing insert toward a transitioning portion 214 of the insert. The injection passage 210 penetrates a disk-shaped feed slot 216 in material-injecting communication with an exit of a transition region 218. Feed material can be injected through the passage 210 through the feed slot 216 and around the entire circumference of cracking gas flowing out of the transition region 218 at a 90° angle to the axis of travel of fluid, e.g., cracking gas, flowing through the transition region. The feed material then impacts the entire circumference of the fluid as described above.

Certain embodiments of the present reactor nozzle and method of use can therefore accomplish cracking of bitumen and other feed stocks primarily, or at least more substantially, by mechanical shear at a molecular level rather than by temperature, retention time, or involvement of catalysts. Although such cracking of the hydrocarbon molecules yields smaller, charge imbalanced hydrocarbon chains which subsequently satisfy their charge imbalance by chemical interaction with other materials in the mixed jet stream or otherwise, the driving force of the hydrocarbon cracking process can be mechanical rather than chemical. In addition, certain embodiments can utilize the greater susceptibility of at least certain heavy hydrocarbons to mechanical cracking in order to selectively crack particular hydrocarbons (such as relatively heavy bitumen for example) as opposed to other lighter hydrocarbons or other materials that may be in the material feed stock as it passes through the nozzle reactor.

Also, in certain embodiments, the configuration of the nozzle reactor can reduce and even virtually eliminate back mixing while enhancing, for example, plug flow of the cracking material and material feed mixture through the reactor body and cooling of the mixture through the reactor body. This can aid in not only enhancing mechanical cracking of the material feed but also in reducing coke formation and wall scaling within the reactor body. In combination with injection of a high velocity cracking material or other motive material from the injection nozzle into the reactor body, coke formation and wall scaling can be even more significantly reduced if not virtually or practically eliminated. In these embodiments, the nozzle reactor can thus provide more efficient and complete cracking, and if desired selective cracking, of heavy hydrocarbons, while reducing and in certain embodiments virtually eliminating wall scaling within the reactor body.

In another embodiment, a nozzle reactor system may be used to increase the overall conversion of material feed into lighter components via cracking. The nozzle reactor system described herein may achieve this increase in overall conversion by utilizing a first nozzle reactor to conduct a first cracking step, and then passing any material not cracked or not sufficiently cracked by the first nozzle reactor into a second nozzle reactor that operates under conditions selected for cracking the uncracked or not sufficiently cracked material.

Figure 10:
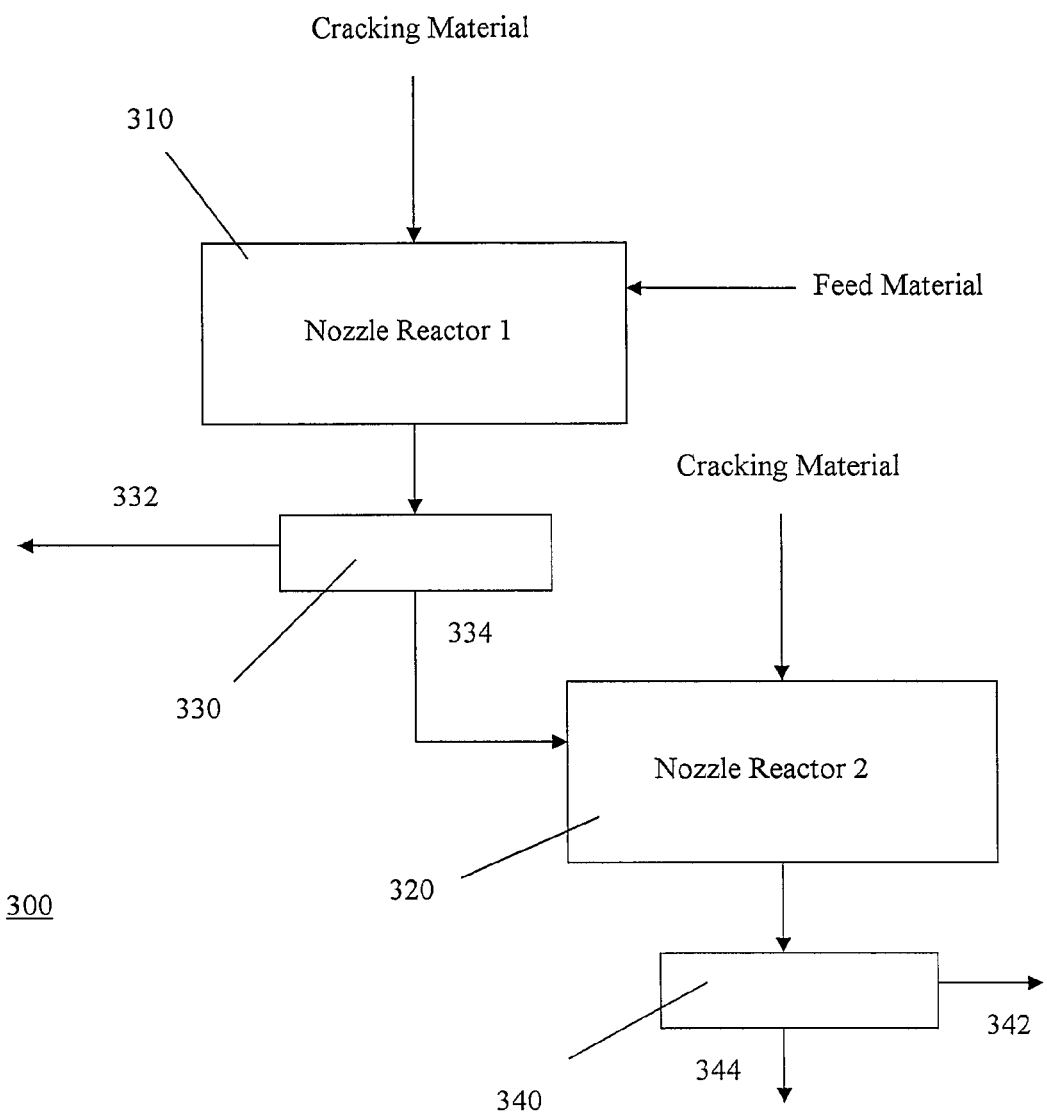
FIG. 10 is a flow diagram illustrating a feed material cracking method according to an embodiment disclosed herein.
Figure 11:
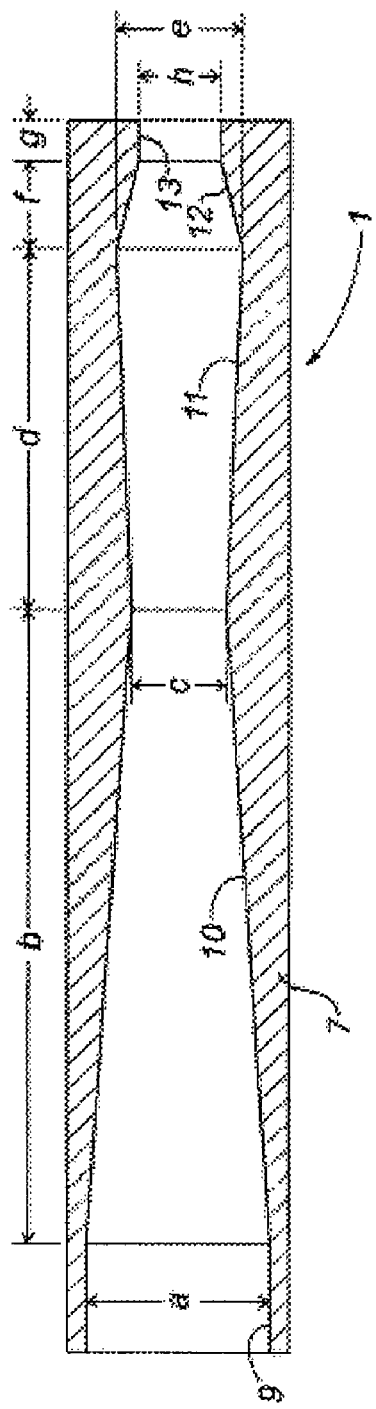
FIG. 11 is the nozzle reactor shown in FIG. 2 of the '615 Publication.

As shown in FIG. 10, the nozzle reactor system 300 may generally include a first nozzle reactor 310 and a second nozzle reactor 320. Nozzle reactor system 300 may also include a first separation unit 330. First separation unit 330 may generally separate the material leaving first nozzle reactor 310 into a light stream and a heavy stream. Accordingly, first separation unit 330 may include a light stream outlet 332 and a heavy stream outlet 334. Heavy stream outlet 334 may be in fluid communication with the material feed passage of second nozzle reactor 320 so that the heavy components of heavy stream outlet 334 may be transported to second nozzle reactor 320 for cracking.

First and second nozzle reactors 310, 320 may generally include a nozzle reactor according to any embodiment or aspect described herein. In one aspect, first and second nozzle reactors 310, 320 may each have a reactor body, an injection passage, and a material feed passage. The reactor body may include an interior reactor chamber with an injection end and an ejection end. The injection passage may be mounted in the nozzle reactor in material injecting communication with the injection end of the interior reactor chamber. Furthermore, the injection passage may have an enlarged volume injection section, an enlarged volume ejection section, and a reduced volume mid-section intermediate the enlarged volume injection section and enlarged volume ejection section. The injection passage may also have a material injection end and a material ejection end in injecting communication with the interior reactor chamber. The material feed passage may penetrate the reactor body. The location of the material feed passage may be adjacent to the material ejection end of the injection passage and transverse to an injection passage axis extending from the material injection end to the material ejection end in the injection passage.

First and second nozzle reactors 310, 320 may be identical or first and second nozzle reactors 310, 320 may be different. In one aspect of the embodiment, second nozzle reactor 320 has a smaller interior body chamber volume than the interior reactor chamber volume of first nozzle reactor 310. For example, the interior reactor chamber volume of second nozzle reactor 320 may be ⅓ or less the interior reactor chamber volume of first nozzle reactor 310. Additionally, nozzle reactor system 300 may include more than two nozzle reactors. Other features of the nozzle reactor are described in greater detail above.

First separation unit 330 may generally include any type of separation unit capable of separating the lighter material that is the product of cracking the material feed fed into first nozzle reactor 310 from the heavy material that may generally be made up of material feed that was not cracked or not sufficiently cracked in first nozzle reactor 310. Examples of suitable separation units include, but are not limited to, distillation units, gravity separation units, filtration units, and cyclonic separation units.

First separation unit 330 may be in fluid communication with the ejection end of first nozzle reactor 310 such that the material leaving first nozzle reactor 310 is fed into first separation unit 330. Any manner of fluid communication may be used between first nozzle reactor 310 and first separation unit 330. In one example, the fluid communication may be piping extending between the ejection end of first nozzle reactor 310 and first separation unit 330.

As noted above, first separation unit 330 may generally include light stream outlet 332 and heavy stream outlet 334. Light stream outlet 332 may generally include any materials having a predetermined property or properties, such as a molecular weight, boiling point, API gravity, or viscosity. As such, light stream outlet 332 may include, for example, a) material feed that is not cracked inside first nozzle reactor 310 but that possessed a predetermined property prior to being introduced into first nozzle reactor 310, and b) material feed that has been cracked inside first nozzle reactor 310 such that the cracked material obtains the predetermined property. Thus, where the material feed injected into first nozzle reactor 310 via the material feed passage is bitumen, light stream outlet 332 may comprise uncracked hydrocarbons that had the predetermined property when injected into first nozzle reactor 310 and cracked hydrocarbon molecules that obtained the predetermined property upon being cracked inside of first nozzle reactor 310. Correspondingly, heavy stream outlet 334 may generally include any materials not having the predetermined property or properties. As such, heavy stream outlet 334 may include, for example, a) material feed that is not cracked inside first nozzle reactor 310 and that did not possess the predetermined property upon being introduced into first nozzle reactor 310, and b) material feed that has been cracked inside first nozzle reactor 310 but that did not result in the cracked material possessing the predetermined property. Thus, where the material feed is bitumen, heavy stream outlet 334 may include uncracked hydrocarbon molecules that did not have the predetermined property when injected into first nozzle reactor 310 and cracked hydrocarbon molecules that did not obtain the predetermined property upon being cracked inside of first nozzle reactor 310.

Any property, property value or property range may be selected to determine whether a material is part of light stream outlet 332 or heavy stream outlet 334. Examples of properties and property values that may be used to classify the material leaving first nozzle reactor 310 may include a molecular weight above a selected value, a molecular weight below a selected value, a molecular weight within a selected range, a boiling point above a selected value, a boiling point below a selected value, a boiling point within a selected range, an API gravity above a selected value, an API gravity below a selected value, an API within a selected range, a viscosity above a selected value, a viscosity below a selected value, or a viscosity within a selected range. Furthermore, multiple properties may be used to determine whether a material leaving first nozzle reactor 310 is part of light stream outlet 332 or heavy stream outlet 334. For example, the material may have to have both a molecular weight below a selected value and a boiling point below a selected value to be part of light stream outlet 332. The value or range selected for the property is also not limited. The value or range of values selected may be based on known property values for useful fractions of a material feed.

In order to transport the components of heavy stream outlet 334 to second nozzle reactor 320, a fluid communication may be established between heavy stream outlet 334 and second nozzle reactor 320. More specifically, a fluid communication may be established between heavy stream outlet 334 and the material feed passage of second nozzle reactor 320. However, fluid communication may also be established between heavy stream outlet 334 and any portion of second nozzle reactor 320. Any manner of fluid communication may be used between second nozzle reactor 320 and heavy stream outlet 334. In one example, the fluid communication may be piping extending between the heavy stream outlet 334 and second nozzle reactor 320. A pump may also be used in connection with the fluid communication to assist the flow of material through the fluid communication.

Second nozzle reactor 320 may be operated at different operating conditions than first nozzle reactor 310 so as to increase the likelihood of cracking the components of heavy stream outlet 334. It is generally theorized that nozzle reactors as described herein crack the molecules having the largest molecular mass first. In first nozzle reactor 310, a relatively high operating temperature may be selected such that only a high boiling point fraction of the feed material is present in the reaction chamber as a liquid (or possibly a solid), while the remaining fractions are present in the reaction chamber as a gas. As such, the fraction that is present in the reaction chamber as a liquid or solid has the largest molecular mass and will be the first material cracked by the shock waves produced inside the nozzle reactor. Gaseous fractions may pass through the reaction chamber without being cracked. These gaseous fractions may then become part of the heavy stream fed to second nozzle reactor 320. If second nozzle reactor 320 is operated at the same operating conditions as first nozzle reactor 310, the heavy stream will remain in the gas phase and likely pass through second nozzle reactor 320 with no further cracking being accomplished. Accordingly, the operating conditions that may be altered between the first and second nozzle reactors 310, 320 are those which will increase the mass of the components of heavy stream outlet 334 as they enter second nozzle reactor 320. In other words, operating second nozzle reactor 320 under conditions that will transform the gaseous heavy stream into a liquid or solid may increase the rate at which second nozzle reactor 320 cracks the components of heavy stream outlet 334. Exemplary operating conditions that may be altered between first nozzle reactor 310 and second nozzle reactor 320 and that will increase the mass of the components of heavy stream outlet 334 include decreasing the temperature of the components of heavy stream outlet 334. Reduction in temperature may be achieved by reducing the ratio of cracking material mass to material feed mass or by reducing the superheat in the cracking material while maintaining the ratio of cracking material mass to material feed mass.

In another aspect of this embodiment, nozzle reactor system 300 may further include a second separation unit 340. Second separation unit 340 may be in fluid communication with the ejection end of second nozzle reactor 320 such that material leaving second nozzle reactor 320 is fed into second separation unit 340. Second separation unit 340 may generally include a light stream outlet 342 and a heavy stream outlet 344.

Like first separation unit 330, second separation unit 340 may generally include any type of separation unit capable of separating lighter material that possesses a predetermined property when leaving second nozzle reactor 320 from the heavy material that does not possesses the predetermined property when leaving second nozzle reactor 320. Examples of suitable separation units include, but are not limited to, distillation units, gravity separation units, filtration units, and cyclonic separation units.

Second separation unit 340 may be in fluid communication with the ejection end of second nozzle reactor 320 such that the material leaving second nozzle reactor 320 is fed into second separation unit 340. Any manner of fluid communication may be used between second nozzle reactor 320 and second separation unit 340. In one example, the fluid communication may be piping extending between the ejection end of second nozzle reactor 320 and second separation unit 340.

As noted above, second separation unit 340 may generally include light stream outlet 342 and heavy stream outlet 344. Light stream outlet 342 may generally include material that has a predetermined property or properties when leaving second nozzle reactor 320. Correspondingly, heavy stream outlet 344 may generally be comprised of material that does not have the predetermined property or properties when leaving second nozzle reactor 320. The predetermined property or properties used to separate streams in second separation unit 340 need not be the same predetermined property or properties used to separate streams in first separation unit 330. Alternatively, the same predetermined property or properties may be used in both first separation unit 330 and second separation unit 340. As with first separation unit 330, any property, property value or property value ranged may be selected as the parameter for separating light and heavy streams.

In one aspect of the embodiment, light stream outlet 342 may be in fluid communication with first nozzle reactor 310 or second nozzle reactor 320 via a recycle stream. Despite possessing a predetermined property or properties, the material that makes up light stream outlet 342 may still be too large and heavy to be used as useful product, and thus requires further cracking. Such cracking may take place in either first nozzle reactor 310 or second nozzle reactor 320 or both depending on the characteristics (such as molecular weight or boiling point) of the material that makes up light stream outlet 342. Accordingly, providing a fluid communication between light stream outlet 342 and first nozzle reactor 310 and/or second nozzle reactor 320 allows for this second attempt at cracking the material, although this time in an improved condition for cracking. Any manner of fluid communication may be used between light stream output 342 and first nozzle reactor 310 and/or second nozzle reactor 320. In one example, the fluid communication may be piping extending between the light stream output 342 and the material feed passage of first nozzle reactor 310 and/or second nozzle reactor 320.

A similar recycle stream may be used to divert the material of heavy stream outlet 344 back to either first nozzle reactor 310 or second nozzle reactor 320. The manner of providing such a recycle stream may be similar to the recycle stream as described above, such as by providing piping between heavy stream outlet 344 and either first nozzle reactor 310 or second nozzle reactor 320.

Similar recycle streams may also be provided between light stream outlet 332 and first nozzle reactor 310. Additionally, a portion of heavy stream outlet 334 may be recycled back to first nozzle reactor, while the remainder of heavy stream outlet 334 is injected into second nozzle reactor 320 as described in greater detail above. Furthermore, a portion of light stream 332 may be recycled back to first nozzle reactor 310.

In the above description, two nozzle reactors are discussed. However, the nozzle reactor system is not limited to two nozzle reactors. Any number of nozzle reactors arranged in series may be used. Each nozzle reactor may operate at different conditions, with each nozzle reactor operating under conditions specifically selected to increase the likelihood of cracking a material that has passed through a previous nozzle reactor uncracked or not sufficiently cracked. Furthermore, the nozzle reactors may be arranged in parallel in addition to a series arrangement. For example, a first nozzle reactor may produce a heavy stream and a light stream, with the heavy stream being transported to a second nozzle reactor and a light stream being transported to a third nozzle reactor.

In another embodiment, a material feed cracking method is disclosed. The material feed cracking method may generally allow for an increase in conversion of material feed into lighter components by utilizing two or more reactor nozzles. The first reactor nozzle is utilized in a similar fashion to the detailed discussion above regarding the nozzle reactor. However, an additional nozzle reactor is used to deal with the material that passes through the first nozzle reactor but that is not cracked or not sufficiently cracked. More specifically, the operating conditions of the second nozzle reactor may be selected so that the second nozzle reactor is more likely to break down material that passes through the first nozzle reactor uncracked or not sufficiently cracked.

The material feed cracking method may generally include a first step of injecting a first stream of cracking material through an injection passage of a first nozzle reactor into an interior reactor chamber of a first nozzle reactor. Material feed may then be injected into the interior reactor chamber of the first nozzle reactor adjacent to the injection passage of the first nozzle reactor and transverse to the first stream of cracking material entering the interior reaction chamber of the first nozzle reactor from the injection passage of the first nozzle reactor. In this manner, a first light material and a first heavy material may be produced. The method may then include a step of injecting a second stream of cracking material through an injection passage of a second nozzle reactor into an interior reactor chamber of a second nozzle reactor. Additionally, the first heavy material may be injected into the interior reactor chamber of the second nozzle reactor adjacent to the injection passage of the second nozzle reactor and transverse to the second stream of cracking material entering the interior reactor chamber of the second nozzle reactor from the injection passage of the second nozzle reactor. In this manner, a second light material and a second heavy material may be produced.

The first and second nozzle reactors referred to above may generally include a nozzle reactor according to any embodiment or aspect described herein. In one aspect, each nozzle reactor may comprise a reactor body, an injection passage, and a material feed passage. The reactor body may have an interior reactor chamber with an injection end and an ejection end. The injection passage may be mounted in the nozzle reactor in material injecting communication with the injection end of the interior reactor chamber. Furthermore, the injection passage may have an enlarged volume injection section, an enlarged volume ejection section, and a reduced volume mid-section intermediate the enlarged volume injection section and enlarged volume ejection section. The injection passage may also have a material injection end and a material ejection end in injecting communication with the interior reactor chamber. The material feed passage may penetrate the reactor body. The location of the material feed passage may be adjacent to the material ejection end of the injection passage and transverse to an injection passage axis extending from the material injection end to the material ejection end in the injection passage.

The first and second streams of cracking material may be any suitable cracking material for cracking the material feed. In one aspect the cracking material is a cracking gas, such as steam. The first and second streams of cracking material may be introduced into the injection passages at any suitable temperature and pressure. In one embodiment, the first and second streams of cracking material are injected into the injection passage at a temperature of from about 600° C. to about 850° C. and at a pressure of from about 15 bar to about 200 bar.

The material feed may be any type of material that may be broken down into smaller and lighter components. In one aspect of this method, the material feed is a hydrocarbon source, such as heavy oil, bitumen, crude oil, or any residue with a high asphaltene content. The residue may be any residual portion of a separated hydrocarbon stream, such as the bottoms fraction from a distillation unit. The high asphaltene content may be an asphaltene content greater than 4 wt % of the residue. Hydrocarbon sources such as these require cracking to break down the heavy and large molecules of the hydrocarbon into light components that may be beneficially used.

The material feed and first heavy stream may be introduced into the material feed passages at any suitable temperature and pressure. In one embodiment, the material feed and first heavy stream are injected into the material feed passages at a temperature of from about 300° C. to 500° C. and at a pressure of from about 2 about to about 15 bar.

The pressure inside the interior reactor chamber of the first and second nozzle reactor may range from about 2 bar to about 15 bar. The ratio of cracking material to material feed may range from about 0.5:1.0 to about 4:1. The ratio of cracking material to first heavy material may range from about 0.1:1.0 to about 0.8:1.0.

As noted above, the injection of the material feed and the first stream of cracking material may result in the production of first light material and first heavy material. This is because the nozzle reactor does not achieve total cracking of all material feed injected into the first nozzle reactor. The short retention time of the material feed in the interior reactor chamber combined with the preference of the nozzle reactor to crack the largest molecules first does not allow for shockwaves generated by the injection passage to crack all of the material feed, and some material feed will therefore pass all the way through the first nozzle reactor without being cracked. Specifically, fractions of the material feed in a gaseous phase when passing through the interior reactor chamber may pass through the nozzle reactor without being cracked. These gaseous fractions may be considered non-participating in that they will not be cracked by the shock waves. Where such material feed passing through the nozzle uncracked comprises large molecules, further work may need to be done to accomplish cracking of the material into useful material.

In one aspect of this embodiment, the operating conditions of the first nozzle reactor may be selected such that only a fraction of the material feed in the nozzle reactor is in a liquid or solid phase, while the remaining fractions of the material feed are in a gaseous phase. This may be achieved by, for example, pre-heating the material feed prior to injection into the nozzle reactor. In an example where the material feed comprises bitumen, the bitumen may comprise a fraction having a boiling point higher than 200 deg C. The pre-heating temperature may be selected such that only this fraction of the bitumen is in liquid or solid form, and therefore is the fraction most likely to be cracked by the first nozzle reactor. The remaining fractions of the bitumen in the gaseous phase may pass through the first nozzle reactor uncracked, at which point they may be fed to a second nozzle reactor. The temperature of the gaseous material leaving the first nozzle reactor may be altered such that the gas transforms into liquid or solid and thereby increases the chances of the material being cracked in the second nozzle reactor.

Accordingly, the first heavy material may be injected into the second nozzle reactor to undergo another attempt at cracking the material in the nozzle reactor. The second nozzle reactor may be identical in size and dimension to the first nozzle reactor, or may be different than the first nozzle reactor. In one aspect of the embodiment, the operating conditions of the second nozzle reactor are different from the operating conditions of the first nozzle reactor as described in greater detail above. For example, the temperature of the material injected into the second nozzle reactor may be reduced to add mass to the gaseous components being fed into the second nozzle reactor to better accomplish the cracking of the hydrocarbons that make up the first heavy material injected into the second nozzle reactor.

In another aspect of this embodiment, the first light material and the first heavy material leaving the first nozzle reactor may be separated prior to the introduction of the first heavy material into the second nozzle reactor. In this manner, the lighter and smaller components that make up the first light material may be separated for consumption or recycle while the heavy and large components that make up the first heavy material may be sent to the second nozzle reactor. Sending only the first heavy material to the second nozzle reactor may be beneficial because the second nozzle reactor will function to specifically crack these components while not being impeded by the presence of the first light material.

Separation of the first light material and the first heavy material may be accomplished by any suitable means for separation of the components. Properties such as density and boiling point may be used to effect separation. Separation may include, but is not limited to, separation by distillation units, gravity separation units, filtration units, and cyclonic separation units.

As with the first light material and the first heavy material, the second light material and the second heavy material may also be separated. Any suitable means for separation, such as those mentioned above, may be used to effect the separation.

The method may further comprise a step of injecting the first light material, first heavy material, second light material, or second heavy material into the reaction chamber of the first nozzle reactor or second nozzle reactor. In addition or in place of such a recycle stream, the method may further comprise a step of injecting the first light material or second light material into the reaction chamber of the first nozzle reactor.

Example 1

Cold Lake bitumen is injected into the lower section of a Vacuum Distillation Unit (VDU). The bottoms of the VDU are withdrawn from the VDU and comprise a heavy hydrocarbon source having a molecular weight range of from about 300 Daltons to 5,000 Daltons or more. The heavy hydrocarbon source is pre-heated to a temperature of about 752 deg F. (400 deg C.). At this temperature, only the hydrocarbon fraction with a molecular weight larger then about 350 Dalton will be in the liquid and/or solid phase, while the remainder of the hydrocarbon source is in a gaseous state. The hydrocarbon source is injected into an interior reactor chamber of a first nozzle reactor via the material feed passage of the first nozzle reactor.

Simultaneously, superheated steam at a temperature of about 1256 deg F. (680 deg C.) is injected into the converging section of the injection passage of the first nozzle reactor at a flow rate of about 1.5 times the flow rate of the hydrocarbon source.

The first nozzle reactor has an overall length of 8,000 mm and an outside diameter of 1,600 mm. The interior reactor chamber is 7,160 mm long with an injection end diameter of 262 mm and an ejection end diameter of 1,435 mm. The injection passage has a length of 840 mm, with an enlarged volume injection section diameter of 207 mm, a reduced volume mid-section diameter of 70 mm and an enlarged volume ejection section diameter of 147 mm. The pressure in the interior reactor chamber is about 2.

The hydrocarbon source and steam are retained in the first nozzle reactor for a time period of around 1.2 seconds. Shockwaves produced inside the nozzle convert approximately 45% per pass of the hydrocarbon source that has a boiling point of greater than 1050 deg F. (566 deg C.) into lighter hydrocarbons with a boiling point of less than 1050 deg F. (566 deg C.). The nozzle reactor emits a mixture of steam, cracked hydrocarbons, and uncracked hydrocarbons at a temperature of about 788 deg F. (420 deg C.).

The mixture leaving the nozzle reactor is recycled to the same VDU as noted before. Steam in the VDU is condensed. The VDU separates the hydrocarbon into a gaseous hydrocarbon phase (C5 and smaller), gas oil, vacuum distillate and VDU bottoms having a molecular weight range of from 300 Daltons to 5,000 Daltons or more. The gaseous hydrocarbon phase, gas oil and vacuum distillate are collected for consumption. The VDU bottoms are split into two individual streams. A first stream comprising about 75% of the total VDU bottoms stream is recycled back to the first nozzle reactor, while a second stream comprising the remaining 25% is diverted to a second nozzle reactor. This split purges a fraction of the bottoms that has an increased amount of inorganic material, such as vanadium, nickel, and sulfur.

Prior to being introduced into the second nozzle reactor, the second stream is cooled to a temperature of about 700 deg F. (371 deg C.). At this temperature, all of the hydrocarbon material of the second stream is in the liquid phase. The second stream is injected into an interior reactor chamber of a second nozzle reactor via the material feed passage of the second nozzle reactor. Simultaneously, steam at a temperature of 1256 deg F. (680 deg C.) is injected into the interior reactor chamber of the second nozzle reactor via the injection passage at a flow rate of about 2.0 times the flow rate of the hydrocarbon injected into the second nozzle reactor.

The second nozzle reactor has an overall length of 7,000 mm and an outside diameter of 1,300 mm. The interior reactor chamber is 6,400 mm long with an injection end diameter of 187 mm and an ejection end diameter of 1,231 mm. The injection passage has a length of 600 mm, with an enlarged volume injection section diameter of 148 mm, a reduced volume mid-section diameter of 50 mm and an enlarged volume ejection section diameter of 105 mm. The pressure in the interior reactor chamber is about 2.

The second stream and steam are injected into the second nozzle reactor for a time period of no more than 0.6 seconds. Shockwaves produced inside the nozzle reactor convert approximately 65% of the second stream into lighter hydrocarbons. The nozzle reactor emits a mixture of steam, cracked hydrocarbons and uncracked hydrocarbons at a temperature of about 788 deg F.

The mixture leaving the second nozzle reactor is fed to a small Vacuum Separation Unit (VSU). The small VSU separates the mixture into a lighter hydrocarbon having a molecular weight in the range of from about 25 to about 200 Daltons and a heavier hydrocarbon stream having a molecular weight in the range of from about 200 to about 1,000 Daltons. The light hydrocarbon stream is recycled back to the first and large VSU while the heavier hydrocarbon stream is cooled down to about 700 deg F. (371 deg C.) and collected as the final pitch stream for disposal.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A nozzle reactor system of the type useable to inject a first material and a second material to cause interaction between the first material and the second material, the nozzle reactor system comprising:
    a first nozzle reactor, the first nozzle reactor comprising in combination:
        a reactor body having an interior reactor chamber with an injection end and an ejection end;
        an injection passage mounted in the nozzle reactor in material injecting communication with the interior reactor chamber, the injection passage having (a) an enlarged volume injection section, an enlarged volume ejection section, and a reduced volume mid-section intermediate the enlarged volume injection section and enlarged volume ejection section, (b) a material injection end, and (c) a material ejection end in injecting communication with the interior reactor chamber; and
        a material feed passage penetrating the reactor body and being (a) adjacent to the material ejection end of the injection passage and (b) transverse to an injection passage axis extending from the material injection end to the material ejection end in the injection passage;
        wherein the material ejection end of the injection passage has a material ejection end diameter, the injection end of the interior reactor chamber has an injection end diameter, and the material ejection end diameter is smaller than the infection end diameter;
    a second nozzle reactor, the second nozzle reactor comprising in combination:
        a reactor body having an interior reactor chamber with an injection end and an ejection end;
        an injection passage mounted in the nozzle reactor in material injecting communication with the interior reactor chamber, the injection passage having (a) an enlarged volume injection section, an enlarged volume ejection section, and a reduced volume mid-section intermediate the enlarged volume injection section and enlarged volume ejection section, (b) a material injection end, and (c) a material ejection end in injecting communication with the interior reactor chamber; and
        a material feed passage penetrating the reactor body and being (a) adjacent to the material ejection end of the injection passage and (b) transverse to an injection passage axis extending from the material injection end to the material ejection end in the injection passage;
        wherein the material ejection end of the injection passage has a material election end diameter, the injection end of the interior reactor chamber has an injection end diameter, and the material ejection end diameter is smaller than the injection end diameter; and
    a first separation unit in fluid communication with the interior reactor chamber ejection end of the first nozzle reactor, the first separation unit comprising:
        a light stream outlet; and
        a heavy stream outlet in fluid communication with the material feed passage of the second nozzle reactor.

2. The nozzle reactor system as claimed in claim 1, wherein the interior reactor chamber of the first nozzle reactor has an interior reactor chamber volume, the interior reactor chamber of the second nozzle reactor has a interior reactor chamber volume, and the interior reactor chamber volume of the second nozzle reactor is smaller than the interior reactor chamber volume of the first nozzle reactor.

3. The nozzle reactor system as claimed in claim 2, wherein the interior reactor chamber volume of the second nozzle reactor is ⅓ or less of the interior reactor chamber volume of the first nozzle reactor.

4. The nozzle reactor system as claimed in claim 1, wherein the nozzle reactor system further comprises a second separation unit in fluid communication with the interior reactor chamber ejection end of the second nozzle reactor, the second separation unit comprising:
    a light stream outlet; and
    a heavy stream outlet.

5. The nozzle reactor system as claimed in claim 4, wherein the light stream outlet of the second separation unit is in fluid communication with the first nozzle reactor.

6. The nozzle reactor system as claimed in claim 5, wherein the light stream outlet of the second separation unit is in fluid communication with the material feed passage of the first nozzle reactor.

7. The nozzle reactor system as claimed in claim 1, wherein the enlarged volume injection section of each of the first and second nozzle reactors includes a converging central passage section, and the reduced volume mid-section and the enlarged volume ejection section of each of the first and second nozzle reactors includes a diverging central passage section.

8. The nozzle reactor system as claimed in claim 7, wherein the converging central passage section, the reduced volume mid-section, and the diverging central passage section of each of the first and second nozzle reactors provide a radially inwardly curved passage side wall intermediate the material injection end and material ejection end in the injection passage of each of the first and second nozzle reactors.

9. The nozzle reactor system as claimed in claim 1, wherein (a) the interior reactor chamber of each of the first and second nozzle reactors has a central interior reactor chamber axis extending from the injection end to the ejection end of the interior reactor chamber and (b) an injection passage axis of each of the first and second nozzle reactors is coaxial with the central interior reactor chamber axis of each of the first and second nozzle reactors.

10. The nozzle reactor system as claimed in claim 1, wherein the enlarged volume injection section, reduced volume mid-section, and enlarged volume ejection section in the injection passage of each of the first and second nozzle reactors cooperatively provide a substantially isentropic passage for a cracking material through the injection passage of each of the first and second nozzle reactors.

11. The nozzle reactor system as claimed in claim 1, wherein the material feed passage of each of the first and second nozzle reactors is annular.

12. The nozzle reactor system as claimed in claim 1, wherein the interior reactor chamber of each of the first and second nozzle reactors includes a cross-sectional area and wherein the cross-sectional area alternates between maintaining constant and increasing in a direction from the injection end to the ejection end.

* * * * *